US012801979B2

(12) United States Patent
Liang et al.

(10) Patent No.: US 12,801,979 B2
(45) Date of Patent: Nov. 17, 2026

(54) MACHINE LEARNING ALGORITHM SEARCH

(71) Applicant: Google LLC, Mountain View, CA (US)

(72) Inventors: Chen Liang, Stanford, CA (US); David Richard So, San Francisco, CA (US); Esteban Alberto Real, Sunnyvale, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1067 days.

(21) Appl. No.: 17/795,087

(22) PCT Filed: Feb. 8, 2021

(86) PCT No.: PCT/US2021/016997
§ 371 (c)(1),
(2) Date: Jul. 25, 2022

(87) PCT Pub. No.: WO2021/159046
PCT Pub. Date: Aug. 12, 2021

(65) Prior Publication Data
US 2022/0383195 A1 Dec. 1, 2022

Related U.S. Application Data

(60) Provisional application No. 62/971,786, filed on Feb. 7, 2020.

(51) Int. Cl.
*G06N 20/00* (2019.01)
*G06F 18/20* (2023.01)
*G06F 18/21* (2023.01)

(52) U.S. Cl.
CPC .......... *G06N 20/00* (2019.01); *G06F 18/217* (2023.01); *G06F 18/285* (2023.01)

(58) Field of Classification Search
CPC ...... G06N 20/00; G06F 18/217; G06F 18/285
See application file for complete search history.

(56) References Cited

U.S. PATENT DOCUMENTS 11,544,494 B2 * 1/2023 Agrawal .................. G06N 3/08
2019/0325316 A1 * 10/2019 Anderson .............. G06N 3/086
2020/0272908 A1 * 8/2020 Shahrzad ............... G06N 3/126

FOREIGN PATENT DOCUMENTS

CN 107844837 A 3/2018

OTHER PUBLICATIONS

Wistuba, Martin, Ambrish Rawat, and Tejaswini Pedapati. “A survey on neural architecture search.” arXiv preprint arXiv:1905. 01392 (Year: 2019).*

(Continued)

*Primary Examiner* — Shahid K Khan
(74) *Attorney, Agent, or Firm* — Fish & Richardson P.C.

(57) ABSTRACT

A method for searching for an output machine learning (ML) algorithm to perform an ML task is described. The method includes: receiving a set of training examples and a set of validation examples, and generating a sequence of candidate ML algorithms to perform the task. For each candidate ML algorithm in the sequence, the method includes: setting up one or more training parameters for the candidate ML algorithm by executing a respective candidate setup function, training the candidate ML algorithm by processing the set of training examples using a respective candidate predict function and a respective candidate learn function, and evaluating a performance of the trained candidate ML algorithm by executing the respective candidate predict function on the set of validation examples to determine a performance metric. The method includes selecting a trained candidate ML algorithm with the best performance metric as the output ML algorithm for the task.

20 Claims, 7 Drawing Sheets

(56) References Cited

OTHER PUBLICATIONS

Lai, Zhifeng, S. C. Cheung, and Yunfei Jiang. "Dynamic model learning using genetic algorithm under adaptive model checking framework." 2006 Sixth International Conference on Quality Software (QSIC'06). IEEE (Year: 2006).*
Tian, Haiman, Shu-Ching Chen, and Mei-Ling Shyu. "Genetic algorithm based deep learning model selection for visual data classification." 2019 IEEE 20th international conference on information reuse and integration for data science (IRI). IEEE (Year: 2019).*
Tian, Haiman, Shu-Ching Chen, and Mei-Ling Shyu. "Genetic algorithm based deep learning model selection for visual data classification." 2019 IEEE 20th international conference on information reuse and integration for data science (IRI). IEEE, 2019 ( Year: 2019).*
Alba et al., "Parallelism and evolutionary algorithms" IEEE transactions on evolutionary computation 6.5, Oct. 2002, 443-462.
Andrychowicz et al., "Learning to learn by gradient descent by gradient descent" Advances in neural information processing systems 29, 2016, 9 pages.
Angeline et al., "An evolutionary algorithm that constructs recurrent neural networks" IEEE transactions on Neural Networks 5.1, Jan. 1994, 54-65.
Baker et al., "Designing neural network architectures using reinforcement learning" CoRR, Submitted on Nov. 2016, arXiv:1611.02167v1, 15 pages.
Balog et al., "Deepcoder: Learning to write programs" CoRR, Submitted on Nov. 2016, arXiv:1611.01989v1, 19 pages.
Bayer et al., "Evolving memory cell structures for sequence learning" Artificial Neural Networks—ICANN 2009: 19th International Conference, Sep. 2009, 11 pages.
Bello et al., "Neural optimizer search with reinforcement learning" International Conference on Machine Learning. PMLR, Jul. 2017, 10 pages.
Bengio et al., "Estimating or propagating gradients through stochastic neurons for conditional computation" CoRR, Submitted on Aug. 2013, arXiv:1308.3432v1, 12 pages.
Bengio et al., "Use of genetic programming for the search of a new learning rule for neural networks" In Evolutionary Computation, Jun. 1994, 324-328.
Bengio, "Practical recommendations for gradient-based training of deep architectures" CoRR, Submitted on Jun. 2012, arXiv:1206.5533v1, 31 pages.
Bergstra et al., "Random search for hyperparameter optimization" Journal of Machine Learning Research 13, 2012, 281-305.
Cai et al., "Proxylessnas: Direct neural architecture search on target task and hardware" CoRR, Submitted on Dec 2018, arXiv:1812:00332v1, 13 pages.
Chalmers, "The evolution of learning: An experiment in genetic connectionism." Connectionist Models. Morgan Kaufmann, Jan. 1991, 21 pages.
Chen et al., "RENAS: Reinforced evolutionary neural architecture search," Proceedings of the IEEE/CVF Conference on Computer Vision and Pattern Recognition (CVPR), Jun. 15, 2019, 4787-4796.
Chen et al., "Towards synthesizing complex programs from input-output examples" CoRR, Submitted on Jan. 2018, arXiv:1706.01284v2, 31 pages.
Collins, "Discriminative training methods for hidden markov models: Theory and experiments with perceptron algorithms" In Proceedings of the conference on Empirical methods in natural language processing, Jul. 2002, 8 pages.
Cubuk et al., "Autoaugment: Learning augmentation policies from data" CoRR, Submitted on May 2018, arXiv:1805.09501v1, 14 pages.
Cubuk et al., "RandAugment: Practical automated data augmentation with a reduced search space" CoRR, Submitted on Nov. 2019, arXiv:1909.13719v2, 13 pages.
Devlin et al., "Robustfill: Neural program learning under noisy I/O" CoRR, Submitted on Mar. 2017, arXiv:1703.07469v1, 18 pages.
Elsken et al., "Efficient multi-objective neural architecture search via lamarckian evolution" CoRR, Submitted on Feb. 2019, arXiv:1804.09081v4, 23 pages.
Elsken et al., "Neural architecture search" CoRR, Submitted on Aug. 2018, arXiv:1808.05377v1, 16 pages.
Fahlman et al., "The cascade-correlation learning architecture" Advances in neural information processing systems 2, 1989, 524-532.
Floreano et al., "Evolutionary robots with on-line self-organization and behavioral fitness." Neural Networks 13.4-5, Jun. 2000, 31 pages.
Gaier et al., "Weight agnostic neural networks" Advances in neural information processing systems 32, 2019, 15 pages.
Ghiasi et al., "Nas-fpn: Learning scalable feature pyramid architecture for object detection" Proceedings of the IEEE/CVF conference on computer vision and pattern recognition, 2019, 7036-7045.
Graves et al., "Neural turing machines" CoRR, Submitted on Oct. 2014, arXiv:1410.5401v1, 26 pages.
Hazan et al., "Beyond convexity: Stochastic quasi-convex optimization" In Advances in Neural Information Processing Systems, 2015, 9 pages.
He et al., "Delving deep into rectifiers: Surpassing human-level performance on ImageNet classification" Proceedings of the IEEE international conference on computer vision, 2015, 1026-1034.
Hochreiter et al., "Long short-term memory" Neural Computation, Nov. 1997, 1735-1780.
International Preliminary Report on Patentability in International Appln. No. PCT/US2021/016997, mailed on Aug. 18, 2022, 11 pages.
International Search Report and Written Opinion in International Appln. No. PCT/US2021/016997, mailed on Jun. 7, 2021, 17 pages.
Jaderberg et al., "Population based training of neural networks" CoRR, Submitted on Nov. 2017, arXiv:1711.09846v1, 21 pages.
Jayakumar et al., "Multiplicative interactions and where to find them." International conference on learning representations, Sep. 2019, 15 pages.
Jozefowicz et al., "An empirical exploration of recurrent network architectures" International conference on machine learning. PMLR, Jun. 2015, 9 pages.
Kim et al., "Deep clustered convolutional kernels" CoRR, Submitted on Mar. 2015, arXiv:1503.01824v1, 9 pages.
Krizhevsky et al., "Learning multiple layers of features from tiny images" Apr. 2009, 60 pages.
Lake et al., "Human-level concept learning through probabilistic program induction" Science 350.6266, Dec 2015, 1332-1338.
LeCun et al., "Convolutional networks for images, speech, and time series" The handbook of brain theory and neural networks 3361.10, Apr. 1995, 14 pages.
LeCun et al., "The mnist database of handwritten digits" 2005, 10 pages.
Levy, "The power of normalization: Faster evasion of saddle points" CoRR, Submitted on Nov. 2016, arXiv:1611.04831v1, 33 pages.
Li et al., "Hyperband: A novel bandit-based approach to hyperparameter optimization" The journal of machince learning research, 18.1, Jan. 2017, 52 pages.
Li et al., "Learning to optimize" CoRR, Submitted on Jun. 2016, arXiv:1606.01885v1, 9 pages.
Li et al., "Random search and reproducibility for neural architecture search" CoRR, Submitted on Feb. 2019, arXiv:1902.07638v1, 21 pages.
Liang et al., "Memory augmented policy optimization for program synthesis and semantic parsing" Advances in Neural Information Processing Systems 31, 2018, 13 pages.
Liang et al., "Neural symbolic machines: Learning semantic parsers on freebase with weak supervision" In Proceedings of the 55th annual Meeting of Association for Computational Linguistics, Jul. 2017, 23-33.
Liu et al., "Auto-deeplab: Hierarchical neural architecture search for semantic image segmentation" Proceedings of the IEEE/CVF conference on computer vision and pattern recognition, 2019, 82-92.

(56) References Cited

OTHER PUBLICATIONS

Liu et al., "Darts: Differentiable architecture search." CoRR, Submitted on Jun. 2018, arXiv:1806.09055v1, 12 pages.
Liu et al., "Progressive neural architecture search." Proceedings of the European conference on computer vision (ECCV), 2018, 16 pages.
Loshchilov et al., "Cma-es for hyperparameter optimization of deep neural networks" CoRR, Submitted on Apr. 2016, arXiv:1604.07269v1, 8 pages.
Mei et al., "Atomnas: Fine-grained end-to-end neural architecture search" CoRR, Submitted on Dec 2019, arXiv:1912.09640v1, 13 pages.
Mendoza et al., "Towards automatically-tuned neural networks." Workshop on automatic machine learning Workshop on automatic machine learning, Dec 2016, 58-65.
Metz et al., "Meta-learning update rules for unsupervised representation learning" CoRR, Submitted on Feb. 2019, arXiv:1804.0222v3, 27 pages.
Miikkulainen et al., "Evolving deep neural networks" CoRR, Submitted on Mar. 2017, arXiv:1703.00548v1, 8 pages.
Nair et al., "Rectified linear units improve restricted boltzmann machines" Proceedings of the 27th international conference on machine learning, 2010, 8 pages.
Neelakantan et al., "Neural programmer: Inducing latent programs with gradient descent" CoRR, Submitted on Nov. 2015, arXiv:1511.04834v1, 17 pages.
Negrinho et al., "Towards modular and programmable architecture search" Advances in neural information processing systems 32, 11 pages.
Noy et al., "Asap: Architecture search, anneal and prune" CoRR, Submitted on Apr. 2019, arXiv:1904.04123v1, 13 pages.
Orchard et al., "The evolution of a generalized neural learning rule." 2016 International Joint Conference on Neural Networks (IJCNN), IEEE, Jul. 2016, 7 pages.
Parisotto et al., "Neuro-symbolic program synthesis" CoRR, Submitted on Nov. 2016, arXiv:1611.01855v1, 14 pages.
Park et al., "Specaugment: A simple data augmentation method for automatic speech recognition" CoRR, Submitted on Apr. 2019, arXiv:1904.08779v1, 6 pages.
Pascanu et al., "On the difficulty of training recurrent neural networks" In International conference on machine learning, May 2013, 9 pages.
Polozov et al., "Flashmeta: A framework for inductive program synthesis" Proceedings of the 2015 ACM SIGPLAN International Conference on Object-Oriented Programming, Systems, Languages, and Applications, Oct. 2015, 20 pages.
Polyak et al., "Acceleration of stochastic approximation by averaging" SIAM journal on control and optimization 30.4, Jul. 1992, 838-855.
Ramachandran et al., "Searching for activation functions" CoRR, Submitted on Oct. 2017, arXiv:1710.05941v2, 13 pages.
Ravi et al., "Optimization as a model for few-shot learning" International conference on learning representations, Nov. 2016, 11 pages.
Real et al., "Large-scale evolution of image classifiers" International conference on machine learning. PMLR, Jul. 2017, 2902-2911.
Real et al., "Regularized evolution for image classifier architecture search" CoRR, Submitted on Feb. 16, 2019, arXiv:1802.01548v7, 16 pages.
Reed et al., "Neural programmer-interpreters" CoRR, Submitted on Nov. 2015, arXiv:1511.06279v1, 12 pages.
Risi et al., "Indirectly encoding neural plasticity as a pattern of local rules" In International Conference on Simulation of Adaptive Behavior, Aug. 2010, 11 pages.
Rumelhart et al., "Learning representations by back-propagating errors" nature 323.6088, Oct. 1986, 533-536.
Runarsson et al., "Evolution and design of distributed learning rules" 2000 IEEE Symposium on Combinations of Evolutionary Computation and Neural Networks. Proceedings of the First IEEE Symposium on Combinations of Evolutionary Computation and Neural Networks, May 2000, 59-63.
Schmidhuber, "Optimal ordered problem solver" Machine Learning, 54(3), Mar. 2004, 211-254.
Silver et al., "Mastering the game of Go with deep neural networks and tree search" nature 529.7587, Jan. 2016, 484-489.
Snoek et al., "Practical bayesian optimization of machine learning algorithms" Advances in neural information processing systems 25, 2012, 9 pages.
So et al., "The evolved transformer" International conference on machine learning. PMLR, May 2019, 10 pages.
Srivastava et al., "Dropout: a simple way to prevent neural networks from overfitting." The journal of machine learning research 15.1, Jan. 2014, 1929-1958.
Stanley et al., "Designing neural networks through neuroevolution" Nature Machine Intelligence 1.1, Jan. 2019, 24-35.
Stanley et al., "Evolving neural networks through augmenting topologies." Evolutionary computation 10.2, Jun. 2002, 99-127.
Suganuma et al., "A genetic programming approach to designing convolutional neural network architectures" Proceedings of the genetic and evolutionary computation conference, Jul. 2017, 5369-5373.
Sun et al., "Evolving deep convolutional neural networks for image classification" CoRR, Submitted on Oct. 2017, arXiv:1710.10741v1, 15 pages.
Tan et al., "MnasNet: Platform-aware neural architecture search for mobile" Proceedings of the IEEE/CVF conference on computer vision and pattern recognition, 2019, 2820-2828.
Valkov et al., "Houdini: Lifelong learning as program synthesis" Advances in neural information processing systems 31, 2018, 12 pages.
Vanschoren, "Chapter 2 : Meta-learning" Automated Machine Learning, 2019, 35-61.
Wang et al., "Paired open-ended trailblazer (poet): Endlessly generating increasingly complex and diverse learning environments and their solutions" CoRR, Submitted on Jan. 2019, arXiv:1901.01753v1, 27 pages.
Wichrowska et al., "Learned optimizers that scale and generalize." International conference on machine learning, PMLR, Jul. 2017, 10 pages.
Wilson et al., "Evolving simple programs for playing Atari games" CoRR, Submitted on Jun. 2018, arXiv:1806.05695v1, 8 pages.
Wistuba et al., "A survey on neural architecture search" CoRR, Submitted on Jun. 18, 2019, arXiv:1905.01392v2, 53 pages.
Wu et al., "Google's neural machine translation system: Bridging the gap between human and machine translation" CoRR, Submitted on Sep. 2016, arXiv:1609.08144v1, 23 pages.
Xie et al., "Exploring randomly wired neural networks for image recognition" In Proceedings of the IEEE International Conference on Computer Vision, 2019, 1284-1293.
Xie et al., "Genetic cnn" Proceedings of the IEEE international conference on computer vision, 2017, 1379-1388.
Yang et al., "Nas evaluation is frustratingly hard" CoRR, Submitted on Dec 2019, arXiv:1912.12522v1, 13 pages.
Yao et al., "Taking human out of learning applications: A survey on automated machine learning" CoRR, Submitted on Oct. 2018, arXiv:1810.13306v1, 22 pages.
Yao, "Evolving artificial neural networks" Proceedings of the IEEE, vol. 87, No. 9, Sep. 1999, 1423-1447.
Ying et al., "Nas-bench-101: Towards reproducible neural architecture search" International conference on machine learning. PMLR, May 2019, 10 pages.
Yu et al., "Block-normalized gradient method: An empirical study for training deep neural network" CoRR, Submitted on Apr. 2018, arXiv:1707.04822v2, 16 pages.
Zela et al., "Towards automated deep learning: Efficient joint neural architecture and hyperparameter search" CoRR, Submitted on Jul. 2018, arXiv:1807.06906v1, 11 pages.
Zhong et al., "Practical block-wise neural network architecture generation" CoRR, Submitted on Mar. 2018, arXiv:1708.05552v2, 11 pages.

(56) References Cited

OTHER PUBLICATIONS

Zoph et al., "Learning transferable architectures for scalable image recognition" Proceedings of the IEEE conference on computer vision and pattern recognition, 2018, 8697-8710.
Zoph et al., "Neural architecture search with reinforcement learning" CoRR, Submitted on Feb. 15, 2017, arXiv:1611.01578v2, 16 pages.
Office Action in European Appln. No. 21708884.8, mailed on Nov. 5, 2024, 11 pages.
Office Action in Chinese Appln. No. 202180012813.0, mailed on May 29, 2026, 23 pages (with English translation).
Real et al., "Regularized Evolution for Image Classifier Architecture Search, " Paper, Presented at Proceedings of the AAAI Conference on Artificial Intelligence, Honolulu, HI, Jan. 27-Feb. 1, 2019; AAAI Technical Track: Machine Learning, Jul. 17, 2019, 33(1):4780-4789.

* cited by examiner

500

502

504

506

```
def Setup():
  s4 = 1.8e-3 # Learning rate
def Predict(): # v0=features
  v2 = v0 + v1 # Add noise
  v3 = v0 - v1 # Subtract noise
  v4 = dot(m0, v2) # Linear
  s1 = dot(v3, v4) # Mult.interac.
  m0 = s2 * m2 # Copy weights
def Learn(): # s0=label
  s3 = s0 - s1 # Compute error
  m0 = outer(v3, v0) # Approx grad
  s2 = norm(m0) # Approx grad norm
  s5 = s3 / s2 # Normalized error
  v5 = s5 * v3
  m0 = outer(v5, v2) # Grad
  m1 = m1 + m0 # Update weights
  m2 = m2 + m1 # Accumulate wghts.
  m0 = s4 * m1
  # Generate noise
  v1 = uniform(2.4e-3, 0.67)
```

FIG. 5

Table S1: Ops vocabulary. $s$, $\vec{v}$ and $M$ denote a scalar, vector, and matrix, resp. Early-alphabet letters ($a$, $b$, *etc.*) denote memory addresses. Mid-alphabet letters (*e.g.* $i$, $j$, *etc.*) denote vector/matrix indexes ("Index" column). Greek letters denote constants ("Consts." column). $\mathcal{U}(\alpha, \beta)$ denotes a sample from a uniform distribution in $[\alpha, \beta]$. $\mathcal{N}(\mu, \sigma)$ is analogous for a normal distribution with mean $\mu$ and standard deviation $\sigma$. $\mathbb{1}_X$ is the indicator function for set $X$. Example: "$M_a^{(i,j)} = \mathcal{U}(\alpha, \beta)$" describes the operation "assign to the $i,j$-th entry of the matrix at address $a$ a value sampled from a uniform random distribution in $[\alpha, \beta]$".

| Op ID | Code Example | Input Args: Addresses / types | Input Args: Consts. | Output Args: Address / type | Output Args: Index | Description (see caption) | |
|---|---|---|---|---|---|---|---|
| OP0 | no_op | – | – | – | – | – | |
| OP1 | s2=s3+s0 | a,b / scalars | – | c / scalar | – | $s_c = s_a + s_b$ | Arithmetic |
| OP2 | s4=s0-s1 | a,b / scalars | – | c / scalar | – | $s_c = s_a - s_b$ | Arithmetic |
| OP3 | s8=s5*s5 | a,b / scalars | – | c / scalar | – | $s_c = s_a \, s_b$ | Arithmetic |
| OP4 | s7=s5/s2 | a,b / scalars | – | c / scalar | – | $s_c = s_a / s_b$ | Arithmetic |
| OP5 | s8=abs(s0) | a / scalar | – | b / scalar | – | $s_b = \lvert s_a \rvert$ | Arithmetic |
| OP6 | s4=1/s8 | a / scalar | – | b / scalar | – | $s_b = 1/s_a$ | Arithmetic |
| OP7 | s5=sin(s4) | a / scalar | – | b / scalar | – | $s_b = \sin(s_a)$ | Trigonometry |
| OP8 | s1=cos(s4) | a / scalar | – | b / scalar | – | $s_b = \cos(s_a)$ | Trigonometry |
| OP9 | s3=tan(s3) | a / scalar | – | b / scalar | – | $s_b = \tan(s_a)$ | Trigonometry |
| OP10 | s0=arcsin(s4) | a / scalar | – | b / scalar | – | $s_b = \arcsin(s_a)$ | Trigonometry |
| OP11 | s2=arccos(s0) | a / scalar | – | b / scalar | – | $s_b = \arccos(s_a)$ | Trigonometry |
| OP12 | s4=arctan(s0) | a / scalar | – | b / scalar | – | $s_b = \arctan(s_a)$ | Trigonometry |
| OP13 | s1=exp(s2) | a / scalar | – | b / scalar | – | $s_b = e^{s_a}$ | Pre-Calculus |
| OP14 | s0=log(s3) | a / scalar | – | b / scalar | – | $s_b = \log s_a$ | Pre-Calculus |
| OP15 | s3=heaviside(s0) | a / scalar | – | b / scalar | – | $s_b = \mathbb{1}_{\mathbb{R}^+}(s_a)$ | Pre-Calculus |
| OP16 | v2=heaviside(v2) | a / vector | – | b / vector | – | $\vec{v}_b^{(i)} = \mathbb{1}_{\mathbb{R}^+}(\vec{v}_a^{(i)}) \; \forall i$ | Pre-Calculus |
| OP17 | m7=heaviside(m3) | a / matrix | – | b / matrix | – | $M_b^{(i,j)} = \mathbb{1}_{\mathbb{R}^+}(M_a^{(i,j)}) \; \forall i,j$ | Pre-Calculus |
| OP18 | v1=s7*v1 | a,b / sc,vec | – | c / vector | – | $\vec{v}_c = s_a \, \vec{v}_b$ | Linear Algebra |
| OP19 | v1=bcast(s3) | a / scalar | – | b / vector | – | $\vec{v}_b^{(i)} = s_a \quad \forall i$ | Linear Algebra |
| OP20 | v5=1/v7 | a / vector | – | b / vector | – | $\vec{v}_b^{(i)} = 1/\vec{v}_a^{(i)} \quad \forall i$ | Linear Algebra |
| OP21 | s0=norm(v3) | a / scalar | – | b / vector | – | $s_b = \lvert \vec{v}_a \rvert$ | Linear Algebra |
| OP22 | v3=abs(v3) | a / vector | – | b / vector | – | $\vec{v}_b^{(i)} = \lvert \vec{v}_a^{(i)} \rvert \quad \forall i$ | Linear Algebra |

[Table continues on the next page.]

FIG. 6

Table S1: Ops vocabulary (continued)

| Op ID | Code Example | Input Args Addresses / types | Input Args Consts | Output Args Address / type | Output Args Index | Description (see caption) | |
|---|---|---|---|---|---|---|---|
| OP23 | v6=v0+v9 | a,b / vectors | – | c / vector | – | $\vec{v}_c = \vec{v}_a + \vec{v}_b$ | Linear Algebra |
| OP24 | v1=v0-v9 | a,b / vectors | – | c / vector | – | $\vec{v}_c = \vec{v}_a - \vec{v}_b$ | Linear Algebra |
| OP25 | v8=v1*v9 | a,b / vectors | – | c / vector | – | $\vec{v}_c^{(i)} = \vec{v}_a^{(i)}\,\vec{v}_b^{(i)}\ \forall i$ | Linear Algebra |
| OP26 | v9=v8/v2 | a,b / vectors | – | c / vector | – | $\vec{v}_c^{(i)} = \vec{v}_a^{(i)}/\vec{v}_b^{(i)}\ \forall i$ | Linear Algebra |
| OP27 | s6=dot(v1,v5) | a,b / vectors | – | c / scalar | – | $s_c = \vec{v}_a^T\,\vec{v}_b$ | Linear Algebra |
| OP28 | m1=outer(v6,v5) | a,b / vectors | – | c / matrix | – | $M_c = \vec{v}_a\,\vec{v}_b^T$ | Linear Algebra |
| OP29 | m1=s4*m2 | a,b / sc/mat | – | c / matrix | – | $M_c = s_a\,M_b$ | Linear Algebra |
| OP30 | m3=1/m0 | a / matrix | – | b / matrix | – | $M_b^{(i,j)} = 1/M_a^{(i,j)}\ \forall i,j$ | Linear Algebra |
| OP31 | v6=dot(m1,v0) | a,b / mat/vec | – | c / vector | – | $\vec{v}_c = M_a\,\vec{v}_b$ | Linear Algebra |
| OP32 | m2=bcast(v0,axis=0) | a / vector | – | b / matrix | – | $M_b^{(i,j)} = \vec{v}_a^{(i)}\ \forall i,j$ | Linear Algebra |
| OP33 | m2=bcast(v0,axis=1) | a / vector | – | b / matrix | – | $M_b^{(j,i)} = \vec{v}_a^{(j)}\ \forall i,j$ | Linear Algebra |
| OP34 | s2=norm(m1) | a / matrix | – | b / scalar | – | $s_b = \lVert M_a \rVert$ | Linear Algebra |
| OP35 | v4=norm(m7,axis=0) | a / matrix | – | b / vector | – | $\vec{v}_b^{(i)} = \lvert M_a^{(i,\cdot)} \rvert\ \forall i$ | Linear Algebra |
| OP36 | v4=norm(m7,axis=1) | a / matrix | – | b / vector | – | $\vec{v}_b^{(j)} = \lvert M_a^{(\cdot,j)} \rvert\ \forall j$ | Linear Algebra |
| OP37 | m9=transpose(m3) | a / matrix | – | b / matrix | – | $M_b = \lvert M_a^T \rvert$ | Linear Algebra |
| OP38 | m1=abs(m8) | a / matrix | – | b / matrix | – | $M_b^{(i,j)} = \lvert M_a^{(i,j)} \rvert\ \forall i,j$ | Linear Algebra |
| OP39 | m2=m3+m0 | a,b / matrixes | – | c / matrix | – | $M_c = M_a + M_b$ | Linear Algebra |
| OP40 | m2=m3-m1 | a,b / matrixes | – | c / matrix | – | $M_c = M_a - M_b$ | Linear Algebra |
| OP41 | m3=m2*m3 | a,b / matrixes | – | c / matrix | – | $M_c^{(i,j)} = M_a^{(i,j)}\,M_b^{(i,j)}\ \forall i,j$ | Linear Algebra |
| OP42 | m4=m2/m4 | a,b / matrixes | – | c / matrix | – | $M_c^{(i,j)} = M_a^{(i,j)}/M_b^{(i,j)}\ \forall i,j$ | Linear Algebra |
| OP43 | m5=matmul(m5,m7) | a,b / matrixes | – | c / matrix | – | $M_c = M_a\,M_b$ | Linear Algebra |
| OP44 | s1=minimum(s2,s3) | a,b / scalars | – | c / scalar | – | $s_c = \min(s_a, s_b)$ | Probability and Statistics |
| OP45 | v4=minimum(v3,v9) | a,b / vectors | – | c / vector | – | $\vec{v}_c^{(i)} = \min(\vec{v}_a^{(i)}, \vec{v}_b^{(i)})\ \forall i$ | Probability and Statistics |
| OP46 | m2=minimum(m2,m1) | a,b / matrixes | – | c / matrix | – | $M_c^{(i,j)} = \min(M_a^{(i,j)}, M_b^{(i,j)})\ \forall i,j$ | Probability and Statistics |
| OP47 | s8=maximum(s3,s0) | a,b / scalars | – | c / scalar | – | $s_c = \max(s_a, s_b)$ | Probability and Statistics |
| OP48 | v7=maximum(v3,v6) | a,b / vectors | – | c / vector | – | $\vec{v}_c^{(i)} = \max(\vec{v}_a^{(i)}, \vec{v}_b^{(i)})\ \forall i$ | Probability and Statistics |
| OP49 | m7=maximum(m1,m0) | a,b / matrixes | – | c / matrix | – | $M_c^{(i,j)} = \max(M_a^{(i,j)}, M_b^{(i,j)})\ \forall i,j$ | Probability and Statistics |
| OP50 | s2=mean(v2) | a / vector | – | b / scalar | – | $s_b = \mathrm{mean}(\vec{v}_a)$ | Probability and Statistics |
| OP51 | s2=mean(m8) | a / matrix | – | b / scalar | – | $s_b = \mathrm{mean}(M_a)$ | Probability and Statistics |
| OP52 | v1=mean(m2,axis=0) | a / matrix | – | b / vector | – | $\vec{v}_b^{(i)} = \mathrm{mean}(M_a^{(i,\cdot)})\ \forall i$ | Probability and Statistics |
| OP53 | v3=std(m2,axis=0) | a / matrix | – | b / vector | – | $\vec{v}_b^{(i)} = \mathrm{stdev}(M_a^{(i,\cdot)})\ \forall i$ | Probability and Statistics |
| OP54 | s3=std(v3) | a / vector | – | b / scalar | – | $s_b = \mathrm{stdev}(\vec{v}_a)$ | Probability and Statistics |
| OP55 | s4=std(m0) | a / matrix | – | b / scalar | – | $s_b = \mathrm{stdev}(M_a)$ | Probability and Statistics |
| OP56 | s2=0.1 | – | $\gamma$ | a / scalar | – | $s_a = \gamma$ | Probability and Statistics |
| OP57 | v3[5]=-2.4 | – | $\gamma$ | a / vector | $i$ | $\vec{v}_a^{(i)} = \gamma$ | Probability and Statistics |
| OP58 | m2[5,1]=-0.03 | – | $\gamma$ | a / matrix | $i, j$ | $M_a^{(i,j)} = \gamma$ | Probability and Statistics |
| OP59 | s4=uniform(-1,1) | – | $\alpha, \beta$ | a / scalar | – | $s_a = \mathcal{U}(\alpha, \beta)$ | Probability and Statistics |
| OP60 | v1=uniform(0.4,0.8) | – | $\alpha, \beta$ | a / vector | – | $\vec{v}_a^{(i)} = \mathcal{U}(\alpha, \beta)\ \forall i$ | Probability and Statistics |
| OP61 | m0=uniform(-0.5,0.6) | – | $\alpha, \beta$ | a / matrix | – | $M_a^{(i,j)} = \mathcal{U}(\alpha, \beta)\ \forall i,j$ | Prob. and Stats. |
| OP62 | s4=gaussian(0.1,0.7) | – | $\mu, \sigma$ | a / scalar | – | $s_a = \mathcal{N}(\mu, \sigma)$ | Prob. and Stats. |
| OP63 | v8=gaussian(0.4,1) | – | $\mu, \sigma$ | a / vector | – | $\vec{v}_a^{(i)} = \mathcal{N}(\mu, \sigma)\ \forall i$ | Prob. and Stats. |
| OP64 | m2=gaussian(-2,1.3) | – | $\mu, \sigma$ | a / matrix | – | $M_a^{(i,j)} = \mathcal{N}(\mu, \sigma)\ \forall i,j$ | Prob. and Stats. |

FIG. 7

MACHINE LEARNING ALGORITHM SEARCH

CROSS REFERENCE TO RELATED APPLICATIONS

This application is a National Stage Application under 35 U.S.C. § 371 and claims the benefit of International Application No. PCT/US2021/016997, filed on Feb. 8, 2021, and claims priority to U.S. Provisional Patent Application No. 62/971,786, filed on Feb. 7, 2020, the entire contents of which are hereby incorporated by reference.

BACKGROUND

This specification relates to determining a machine learning algorithm to perform a machine learning task.

The machine learning algorithm can be, for example, a trained neural network that has been trained to perform the task.

Neural networks that are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that determines an output machine learning algorithm to perform a particular machine learning task.

The subject matter described in this specification can be implemented in particular embodiments so as to realize one or more of the following advantages. Instead of constructing a neural network by combining sophisticated hand-designed components (e.g., convolutions, batch-norm, and dropout) as previous neural architecture search approaches do, the techniques described in this specification allows a system to automatically search for whole machine learning algorithms (e.g., from scratch) with little restriction on the form of the algorithms and using only basic mathematical operations as building blocks. Therefore, the system requires much less human-design, saves human research time and allows for the discovery of non-neural network algorithms (because the system does not assume the existence of a neural network or of gradients when defining the search space) in comparison to conventional techniques for automating machine learning research, which have largely focused on the architecture of neural networks and relied on using sophisticated expert-designed layers as building blocks or similarly constrained search spaces that are heavily reliant on human design. Further, by moving away from expert-designed search spaces, the described techniques can reduce human bias and can eventually lead to creative new machine learning concepts. Additionally, the use of the subject matter described herein to construct machine learning algorithms can lead to an improved performance of a machine learning model on a particular machine learning task. For example, where the machine learning task is an image/audio classification task, the accuracy and/or efficiency of the classification may be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates an example of an output machine learning algorithm.

FIG. 6 shows the first part of Table S1 which includes a list of possible operations including the operations shown in the parent and child algorithms of FIG. 4.

FIG. 7 shows the remaining part of Table S1.

Like reference numbers and designations in the various drawings indicate like elements.

DETAILED DESCRIPTION

Figure 1:
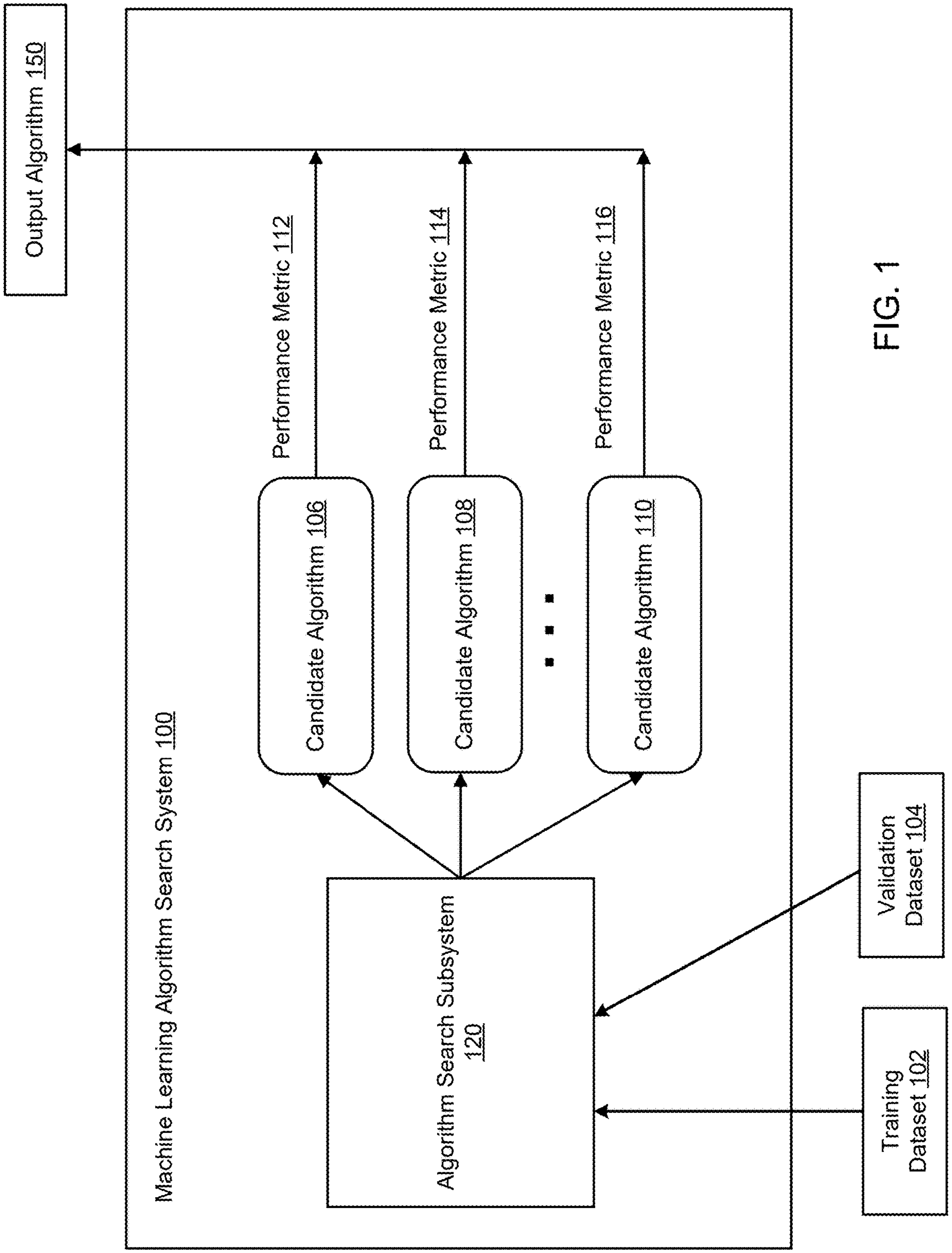
FIG. 1 shows an example machine learning algorithm search system.

This specification describes a system implemented as computer programs on one or more computers in one or more locations that determines an output machine learning algorithm to perform a particular machine learning task (or a set of machine learning tasks).

The machine learning algorithm defines a model architecture for a machine learning model (a neural network) for performing the task, hyperparameters for the training of the model to perform the task, and preprocessing techniques (e.g., data augmentation policies) applied to inputs during, after, or both the training.

The machine learning model can be configured to perform any kind of machine learning tasks, i.e., can be configured to receive any kind of digital data input and to generate any kind of score, classification, or regression output based on the input.

In some cases, the machine learning model is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

FIG. 1 shows an example machine learning algorithm search system 100. The system 100 is an example of a system implemented as computer programs on one or more computers in one or more locations, in which the systems, components, and techniques described below can be implemented.

To determine an output machine learning algorithm (e.g., output machine learning algorithm 150) to perform a particular machine learning task, the system 100 includes an algorithm search subsystem 120 that receives a training dataset 102. The training dataset 102 includes a set of training examples. Each training example in the set of training examples includes an example input for the particular machine learning task and a corresponding example output for the particular machine learning task.

The algorithm search subsystem 120 further receives a validation dataset 104, which includes a set of validation examples. Each validation example in the set of validation examples includes a validation input for the particular machine learning task and a corresponding validation output for the particular machine learning task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the trainee neural network, and then divide the specified data into the training data 102 and the validation set 104.

After receiving the training dataset 102 and validation dataset 104, the subsystem 120 generates a sequence of candidate machine learning algorithms (e.g., candidate algorithms 106, 108, 110) to perform the particular machine learning task. Each candidate machine learning algorithm in the sequence can be represented as a computer program with three component functions including (i) a respective candidate setup function, denoted as Setup( ), (ii) a respective candidate learn function, denoted as Learn( ), and (iii) a respective candidate predict function, denoted as Predict( ).

The respective candidate setup function initializes one or more training parameters of the candidate machine learning algorithm. The training parameters are the parameters of the operations in the machine learning model that are learned or adjusted through training of the machine learning model. For example, the training parameters may be weights of neural network layers of the machine learning model. Optionally, the candidate setup function initializes hyperparameters (e.g., learning rate) for the training of the machine learning model to perform the particular machine learning task.

The respective candidate learn function adjusts training parameters of the candidate machine learning algorithm. The respective candidate predict function predicts an output for the particular machine learning task for a given input for the particular machine learning task using the adjusted training parameters.

More specifically, the candidate predict function and the candidate learn function are executed alternatively during the training of the machine learning model using the training data 102. The candidate predict function is executed on a batch of multiple training examples and the candidate learn function is executed on the outputs generated by the candidate predict function for the batch of multiple training examples. In particular, for a given training example (x, y) in a batch of training examples of the training data 102, the candidate predict function takes as input the example input x and processes the example input x using the current training parameters to generate a predicted output y' for the example input x for the particular machine learning task. The candidate learn function takes as input the example output y in the training example (x, y) and the predicted output y' and adjust the training parameters of the candidate machine learning algorithm based on an error between y and y'. The above process is repeated for the next training examples in the batch (i.e., the candidate predict function takes as input the next example input in the next training example of the batch and processes the next example input using the adjusted training parameters to generate the next predicted output and so on).

The sequence of candidate machine learning algorithms includes at least a subset of algorithms in which two or more of the setup function, predict function and learn function are different from one another.

In some implementations, the subsystem 120 may initialize the sequence of candidate ML algorithms as an empty sequence, i.e., none of three component functions has any instructions or code lines.

In some other implementations, the subsystem 120 may initialize the sequence of candidate ML algorithms by initializing each of the candidate setup function, the candidate predict function, and the candidate predict function of the first candidate machine learning algorithm in the sequence of candidate machine learning algorithms with one or more instructions (e.g., random instructions).

To generate a sequence of candidate machine learning algorithms, the subsystem 120 searches for one or more candidate machine learning algorithms through a machine learning algorithm search space.

The candidate machine learning algorithms can be represented as computer programs which are sequences of instructions that act on a virtual memory.

The machine learning algorithm search space is defined by a sequence of instructions including (i) instructions that specify the operations performed by a setup function of a given candidate machine learning algorithm, (ii) instructions that specify the operations performed by a learn function of the given candidate machine learning algorithm, and (iii) instructions that specify the operations performed by a predict function of the given candidate machine learning algorithm.

Each instruction includes an operation (also referred to as an op) from a predetermined set of operations. For example, the set of operations may include one or more of arithmetic operations (e.g., "multiply a scalar with a vector"), trigonometry operations, pre-calculus operations, linear algebra operations, or probability and statistic operations. In some cases, an operation in the set of operations may require real-valued constants (e.g., μ and σ for a random Gaussian sampling operation), which are searched for as well. To avoid biasing the choice of operations, a criterion may be applied to the predetermined set of operations to enforce that none of the operations in the set exceed a threshold level of complexity.

In addition, each instruction includes a set of arguments. For example, these arguments can be addresses in the virtual memory (e.g., "read the inputs from scalar address 0 and vector address 3; write the output to vector address 2").

In some implementations, the subsystem 120 searches for one or more candidate machine learning algorithms through the machine learning algorithm search space by performing a regularized evolution search process. In particular, at each iteration of the process, the subsystem 120 selects a parent candidate machine learning algorithm from the current sequence of candidate machine learning algorithms. The subsystem 120 modifies the parent candidate machine learning algorithm to generate one or more child candidate machine learning algorithms (also referred to as "child algorithms" for simplicity) by using mutations. The mutations that produce a child algorithm from a parent algorithm is tailored to the search space. For example, the subsystem 120 may use a random choice among the following types of mutations: (i) insert a random instruction at a random location in a component function, (ii) remove an instruction at a random location in a component function, (iii) randomize all the instructions in a component function, or (iv) modify one of the arguments of an instruction in a component function by replacing it with a random choice (e.g. "swap the output address" or "change the value of a constant"). Examples of mutations are further described in detail below with reference to FIG. 4.

In some other implementations, instead of using regularized evolution search, the subsystem 120 searches for the one or more candidate machine learning (ML) algorithms through the machine learning algorithm search space by performing a random search process, in which the one or more candidate machine learning algorithms are selected randomly from the search space according to a particular distribution.

After searching for the one or more candidate ML algorithms, the subsystem 120 adds the one or more candidate ML algorithms to the current sequence of candidate ML algorithms.

In some implementations, the subsystem 120 may remove an existing candidate machine learning algorithm from the current sequence of candidate machine learning algorithms after one or more new candidate ML algorithms are added to the sequence. For example, the subsystem 120 may remove the oldest candidate machine learning algorithm in the current sequence of candidate machine learning algorithms.

The subsystem 120 can repeat the search process multiple times until a criterion is satisfied, e.g., until the number of candidate ML algorithms in the sequence has reached a threshold number or until a predetermined level of accuracy of the candidate ML algorithms in the sequence is obtained.

The process for searching for one or more candidate machine learning algorithms to generate the sequence of candidate ML algorithms is described in more detail below with references to FIG. 2.

For each of the candidate ML algorithms in the sequence, the subsystem 120 sets up one or more training parameters for the candidate machine learning algorithm by executing the candidate setup function associated with the candidate ML algorithm. The subsystem 120 trains the candidate machine learning algorithm on the training data 102 to adjust the one or more training parameters by processing the set of training examples using the candidate predict function and the candidate learn function associated with the candidate ML algorithm. The subsystem 120 may train the candidate machine learning algorithm until one or more criteria are satisfied (e.g., until convergence, or until a predetermined level of performance is obtained).

The subsystem 120 evaluates a performance of the trained candidate machine learning algorithm by executing the candidate predict function on the set of validation examples to determine a performance metric for the trained candidate machine learning algorithm. For example, as shown in FIG. 1, the subsystem 120 determines performance metrics 112, 114, and 116 for candidate ML algorithm 106, 108 and 110, respectively. The performance metric can be, for example, a validation loss, a training loss, a weighted combination of the validation loss and the training loss, or any metric that is appropriate for the particular machine learning task.

In some implementations, the subsystem 120 may evaluate a performance of a trained candidate machine learning algorithm by executing a candidate predict function of the trained candidate ML algorithm on validation examples of a single validation dataset (e.g., the validation dataset 104).

In some other implementations, the subsystem 120 may evaluate a performance of a trained candidate machine learning algorithm by executing a candidate predict function of the trained candidate ML algorithm on validation examples of multiple validation datasets. This would allow for better generalization of the output machine learning algorithm to new datasets (or new machine learning tasks).

After evaluating the algorithms, in some implementations, in some implementations, the subsystem 120 selects a trained candidate machine learning algorithm with the best performance metric among the trained candidate machine learning algorithms as the output machine learning algorithm 150 for the particular machine learning task. In some other implementations, the subsystem 120 selects a set of multiple trained candidate machine learning algorithms having the highest performance metrics, trains each candidate machine learning algorithm in the set longer, and then selects the algorithm with the best performance metric among the algorithms in the set as the output machine learning algorithm 150 for the particular machine learning task. An example of an output machine learning algorithm that could be generated by the above process is shown in FIG. 5.

In some implementations, to attain higher search speeds, the subsystem 120 may execute the search process in parallel by using a parallel budget of workers and using a central server. Each worker runs regularized evolution on its own population (i.e., its own sequence of candidate ML algorithms). The workers can exchange algorithms through migration. That is, the workers can periodically upload randomly selected candidate algorithms to the central server. The central server replies with candidate algorithms randomly sampled across all workers and replaces a portion (e.g., half, one-third, a quarter, or any other portion) of the local population (i.e. random migration).

For example, for each predetermined number of evaluations (e.g., for every 100-10000 evaluations) of performance of candidate machine learning algorithms, each worker uploads a number of candidate algorithms to the central server to replace a corresponding portion of the local population. For example, the worker can upload n/2 candidate algorithms which is half of a population of n algorithms. The central server replies with n/2 algorithms sampled randomly across all workers and replaces half of the worker's population.

In some implementations, to further speed up the search process (e.g., 4 times, 8 times or 10 times speedup), the subsystem 120 may use a functional equivalence checking (FEC) technique to detect equivalent candidate ML algorithms. This technique is useful because the search space is not heavy designed and thus it allows for mutations that do not have an effect on the accuracy (e.g. adding an instruction that writes to an address that is never read). When these mutations occur, the child algorithm behaves identically to its parent. The FEC technique prevents these identically functioning algorithms from being repeatedly evaluated (i.e. trained and validated in full many times), therefore saving the time and computational resource that would otherwise be required to evaluate these equivalent algorithms.

Generally, the subsystem 120 uses the FEC technique as follows. The subsystem 120 performs a novelty check that confirms whether the child candidate machine learning algorithm has a different behavior compared to the current sequence of candidate machine learning algorithms. In response to a determination that the novelty check is yes (which means that the child candidate machine learning algorithm has a different behavior compared to the current sequence of candidate machine learning algorithms), the system adds the child candidate machine learning algorithm to the current sequence of candidate machine learning algorithms. In response to a determination that the novelty check is no, the subsystem 120 skips the evaluation of the child candidate machine learning algorithm.

More particularly, the subsystem 120 maintains a cache that maps evaluated algorithm fingerprints to their accuracies. Before evaluating a candidate algorithm, the subsystem 120 fingerprints it and consults the cache to see if it has already been evaluated. If it has, the subsystem 120 reuses the stored accuracy instead of computing it again. This way, the subsystem 120 can keep the different implementations of the same candidate algorithm for the sake of diversity: even though they produce the same accuracy now, they may behave differently upon further mutation.

For example, to fingerprint a candidate algorithm, the subsystem 120 trains it for 10 steps and validates it on 10 validation examples. The 20 resulting predictions are then truncated and hashed to produce an integer fingerprint. The cache may hold a large number of fingerprint-accuracy pairs (e.g., 100,000 fingerprint-accuracy pairs).

Other techniques may be used to additionally improve the quality of the search. For example, some workers can be allowed to search on training data for additional machine learning tasks, in addition to the training data for particular machine learning task, to promote diversity.

In some implementations, after the output machine learning algorithm 150 is determined, the system 100 deploys the machine learning model defined by the output ML algorithm 150 and then uses the model to process requests received from users, e.g., through the API provided by the system. In other words, the system uses the machine learning model defined by the output ML algorithm 150 to generate new network outputs for new network inputs.

Instead of or in addition to using the machine learning model defined by the output ML algorithm 150, the system 100 can provide data specifying the output machine learning algorithm 150 to a user who submitted a request to find a machine learning model to perform a particular ML task, e.g., through the API.

Figure 2:
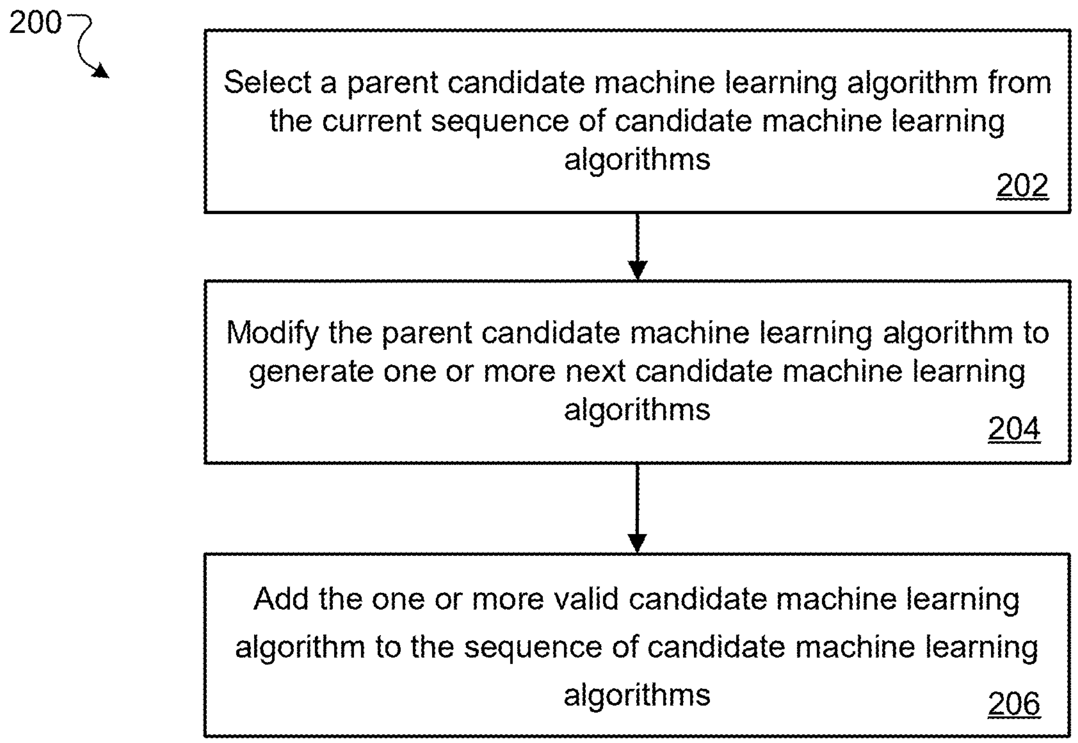
FIG. 2 is a flow diagram of an example process for searching for one or more candidate machine learning algorithms.

FIG. 2 is a flow diagram of an example process 200 for searching for one or more candidate machine learning algorithms. For convenience, the process 200 will be described as being performed by a system of one or more computers located in one or more locations. For example, a machine learning algorithm search system, e.g., the machine learning algorithm search system 100 of FIG. 1, appropriately programmed in accordance with this specification, can perform the process 200.

While the process 200 describes searching for the candidate machine learning algorithm using evolution search, more generally, the system can search for candidate machine learning algorithms using any appropriate technique, e.g., random search, or searching using reinforcement learning or Bayesian optimization.

The system selects a parent candidate machine learning algorithm (also referred to as "parent algorithm") from the current sequence of candidate machine learning algorithms (step 202). The parent candidate machine learning algorithm includes a parent setup function, a parent predict function, and a parent learn function.

In some implementations, to select a parent algorithm, the system randomly chooses multiple candidate machine learning algorithms from the current sequence of candidate machine learning algorithms.

In these implementations, the system selects a chosen candidate machine learning algorithm with the highest performance metric among the plurality of candidate machine learning algorithms as the parent candidate machine learning algorithm.

In some other implementations, to select a parent algorithm, the system selects a plurality of highest performing candidate machine learning algorithms from the current sequence of candidate machine learning algorithms. For example, the system selects the two highest performing algorithms or selecting ten currently highest performing algorithms and then randomly selecting two of them. The system then randomly chooses one of these selected highest performing algorithms as the parent algorithm.

The system modifies the parent candidate machine learning algorithm to generate one or more child candidate machine learning algorithms (step 204). Each child candidate machine learning algorithm (also referred to as "child algorithm") includes a child setup function, a child predict function, and a child learn function.

To generate the one or more child algorithms from the parent algorithm, the system performs the following steps for one or more times.

For at least one of the parent setup function, the parent predict function, or the parent learn function of the parent algorithm, the system performs one or more mutations from a set of mutations. The set of mutations includes, for example, at least one of (i) inserting a random instruction (e.g., an instruction that has a random operation and/or a set of random arguments) into a random position in the current component function, (ii) removing an instruction at a random location in the current component function, (iii) randomizing all the instructions in the current component function, or (iv) modifying a random argument of another random instruction in the current component function. The system creates a child algorithm that has a child setup function, a child predict function, and a child learn function, which were created by modifying at least one of the parent setup function, the parent predict function, or the parent learn function, respectively, as described above.

The system adds the one or more child candidate machine learning algorithms to the current sequence of candidate machine learning algorithms (step 206).

Before adding a child algorithm to the current sequence of candidate machine learning algorithms, the system performs a novelty check that confirms whether each child candidate machine learning algorithm has a different behavior compared to the current sequence of candidate machine learning algorithms. In response to a determination that the novelty check is yes (which means that the child candidate machine learning algorithm has a different behavior compared to the current sequence of candidate machine learning algorithms), the system adds the child candidate machine learning algorithm to the current sequence of candidate machine learning algorithms. In response to a determination that the novelty check is no, the system skips the evaluation of the child candidate machine learning algorithm and does not add the child algorithm to the current sequence. The novelty check is performed by using a functional equivalence checking technique.

In some implementations, the system evaluates each child candidate ML algorithm before adding the child algorithm to the current sequence of candidate machine learning algorithms. In some implementations, the system does not evaluate child algorithms before adding them to the current sequence of candidate machine learning algorithms. Instead, the system evaluates them when the system selects them from the sequence in order to determine a parent algorithm.

To evaluate a candidate machine learning algorithm, the system sets up one or more training parameters for the candidate machine learning algorithm by executing the setup function of the candidate ML algorithm, trains the candidate machine learning algorithm to adjust the one or more training parameters by processing the set of training examples using the candidate predict function and the candidate learn function of the candidate ML algorithm, and determines a performance metric for the trained candidate machine learning algorithm by executing the candidate predict function of the candidate ML algorithm on the set of validation examples.

In some implementations, the system may remove an existing candidate machine learning algorithm from the current sequence of candidate machine learning algorithms after one or more child candidate ML algorithms are added to the sequence. For example, the system may remove the oldest candidate machine learning algorithm in the current sequence of candidate machine learning algorithms or the worst performing candidate algorithm in the current sequence.

The system can repeat the above search process multiple times until a criterion is satisfied, e.g., until the number of candidate ML algorithms in the sequence has reached a threshold number or until a predetermined level of accuracy of the candidate ML algorithms in the sequence is obtained.

Figure 3:
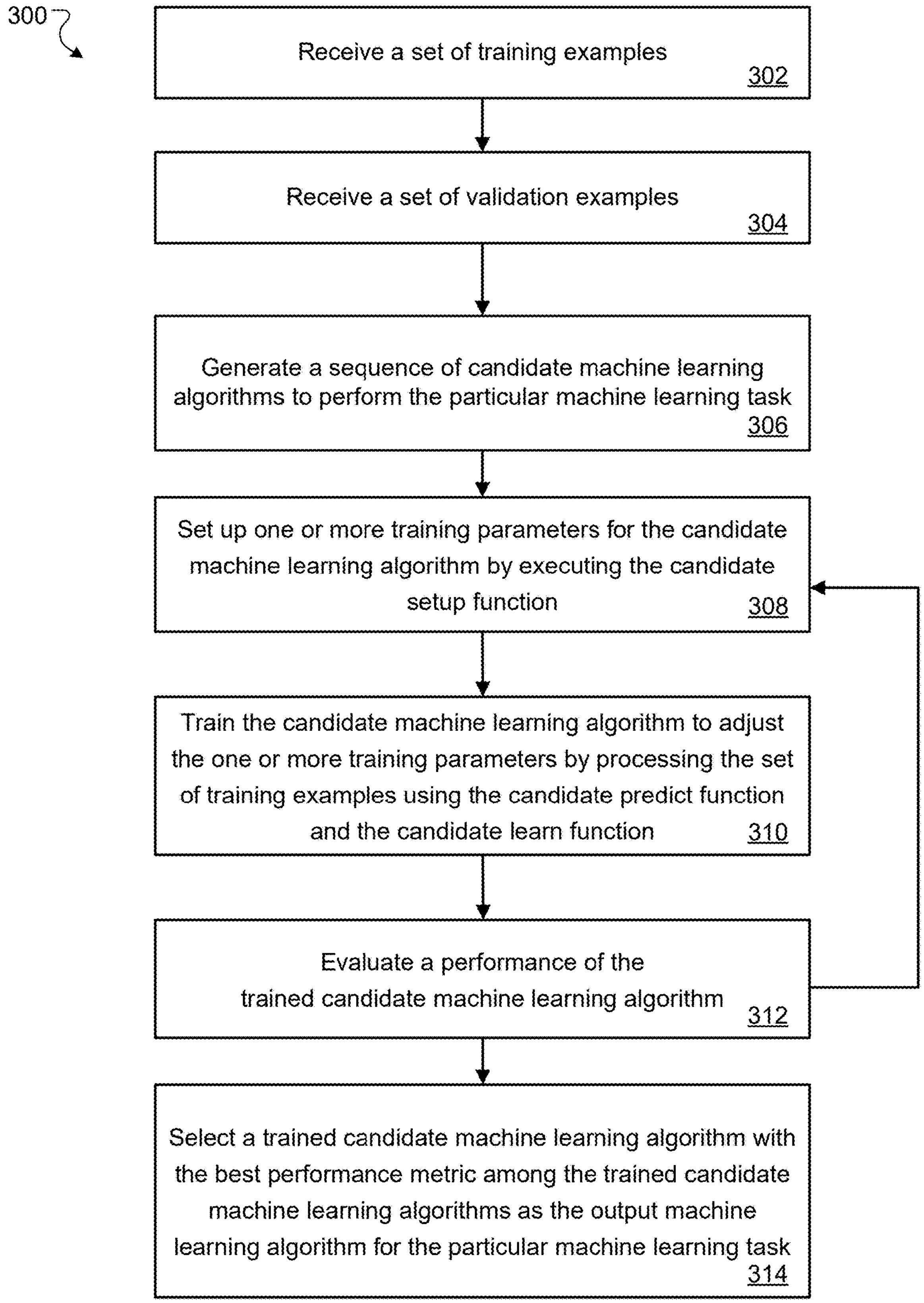
FIG. 3 is a flow diagram of an example process for searching for an output machine learning algorithm to perform a machine learning task.

FIG. 3 is a flow diagram of an example process 300 for searching for an output machine learning algorithm to perform a machine learning task. For convenience, the process 300 will be described as being performed by a system of one or more computers located in one or more locations. For example, a machine learning algorithm search system, e.g., the machine learning algorithm search system 100 of FIG. 1, appropriately programmed in accordance with this specification, can perform the process 300.

The system receives a set of training examples (step 302). Each training example in the set of training examples includes an example input and an example output.

The system receives a set of validation examples (step 304). Each validation example in the set of validation examples comprising a validation input and a validation output.

The system generates a sequence of candidate machine learning algorithms to perform the particular machine learning task (step 306). Each candidate machine learning algorithm in the sequence includes a respective candidate setup function that initializes one or more training parameters of the candidate machine learning algorithm, a respective candidate learn function that adjusts training parameters of the candidate machine learning algorithm, and a respective candidate predict function that predicts an output for, a given input using the adjusted training parameters. The process for generating a sequence of candidate machine learning algorithms is described in more detail above with reference to FIG. 1 and FIG. 2.

For each of the candidate ML algorithms in the sequence, the system performs steps 308-312 as follows.

The system sets up one or more training parameters for the candidate machine learning algorithm by executing the candidate setup function associated with the candidate ML algorithm (step 308).

The system trains the candidate machine learning algorithm to adjust the one or more training parameters by processing the set of training examples using the candidate predict function and the candidate learn function associated with the candidate ML algorithm (310).

The system evaluates a performance of the trained candidate machine learning algorithm by executing the candidate predict function on the set of validation examples to determine a performance metric for the trained candidate machine learning algorithm (step 312).

The system then selects a trained candidate machine learning algorithm with the best performance metric among the trained candidate machine learning algorithms as the output machine learning algorithm for the particular machine learning task (step 314). An example of an output machine learning algorithm that could be generated by the above process is shown in FIG. 5.

Figure 4:
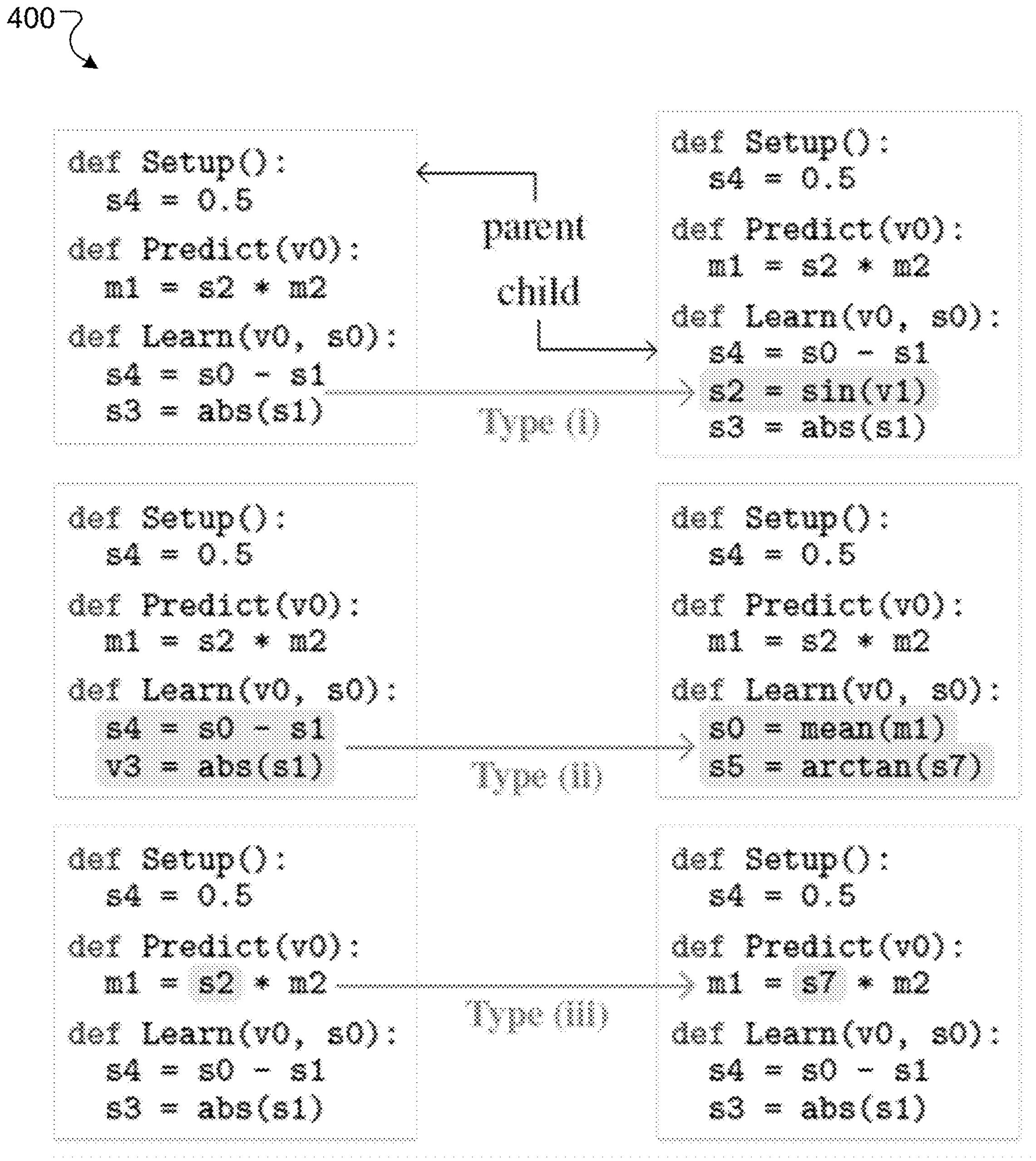
FIG. 4 shows mutation examples for modifying a parent candidate machine learning algorithm to generate one or more child candidate machine learning algorithms.

FIG. 4 shows mutation examples for modifying a parent candidate machine learning algorithm (also referred to as "parent algorithm") to generate one or more child candidate machine learning algorithms (also referred to as "child algorithms"). In FIG. 4, parent algorithms are on the left and child algorithms are on the right. In this example, the parent and child algorithms are represented as computer programs that act on a small virtual memory with separate address spaces for scalar, vector and matrix variables (e.g. s1, v1, m1), all of which are floating-point and share the dimensionality of the input features (F) of the input for the particular machine learning task. Programs are sequences of instructions. Each instruction has an operation—or op—that determines its function (e.g. "multiply a scalar with a vector"). FIG. 6 and FIG. 7 show Table S1 which includes a list of possible operations including the operations shown in the parent and child algorithms of FIG. 4.

In Type (i) mutation example, a child algorithm is created by inserting a random instruction into the corresponding parent algorithm. In Type (ii) mutation example, a child algorithm is created by replacing one or more instructions of the corresponding parent algorithm with a set of randomized instructions. In Type (iii) mutation example, a child algorithm is created by modifying an argument of an instruction of the corresponding parent algorithm.

FIG. 5 shows an example of an output machine learning algorithm 500. In this example, the particular machine learning task is an image classification and the output generated by a machine learning model defined by the output machine learning algorithm for a given image is scores for each of a set of object categories, with each score representing an estimated likelihood that the image contains an image of an object belonging to the category.

In particular, instruction 502 in the Setup( ) function in FIG. 5 initializes a hyperparameter (e.g., learning rate) for the training of the machine learning model to perform the image classification task.

The Predict( ) function, which includes instructions 504, receives input features v0 of an example input x in a training example (x, y) and processes the input features v0 using the current training parameters of the output algorithm 500 to generate a predicted output s1 for the input features v0 for the image classification task.

The Learn( ) function, which includes instructions 506, takes as input the example output y (i.e., label s0) in the training example (x, y) and the predicted output s1. The Learn( ) function adjusts the training parameters of the output algorithm 500 based on an error s3 between s0 and s1.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for searching for an output machine learning algorithm to perform a particular machine learning task, the method comprising:
- receiving a set of training examples, each training example in the set of training examples comprising an example input and an example output;
- receiving a set of validation examples, each validation example in the set of validation examples comprising a validation input and a validation output;
- generating a sequence of candidate machine learning algorithms to perform the particular machine learning task, comprising searching for one or more candidate machine learning algorithms through a machine learning algorithm search space,
- wherein each candidate machine learning algorithm in the sequence is represented as a computer program comprising (i) a respective candidate setup function that initializes one or more training parameters of the candidate machine learning algorithm, (ii) a respective candidate learn function that adjusts training parameters of the candidate machine learning algorithm, and (iii) a respective candidate predict function that predicts an output for a given input using the adjusted training parameters, and wherein the machine learning algorithm search space is defined by instructions that act on addresses in a virtual memory to specify mathematical operations that define respective logic for the setup function, the learn function, and the predict function;
- for each candidate machine learning algorithm in the sequence:
  - setting up one or more training parameters for the candidate machine learning algorithm by executing the candidate setup function,
  - training the candidate machine learning algorithm to adjust the one or more training parameters by processing the set of training examples using the candidate predict function and the candidate learn function, and
  - evaluating a performance of the trained candidate machine learning algorithm by executing the candidate predict function on the set of validation examples to determine a performance metric for the trained candidate machine learning algorithm; and
- selecting a trained candidate machine learning algorithm with the best performance metric among the trained candidate machine learning algorithms as the output machine learning algorithm for the particular machine learning task.

2. The method of claim 1, wherein the particular machine learning task is one of the following tasks: a classification task, a regression task, or an image recognition task.

3. The method of claim 1, wherein the machine learning algorithm search space is defined by a sequence of instructions, wherein the sequence of instructions includes (i) instructions that specify operations performed by a setup function of a given candidate machine learning algorithm, (ii) instructions that specify operations performed by a learn function of the given candidate machine learning algorithm, and (iii) instructions that specify operations performed by a predict function of the given candidate machine learning algorithm.

4. The method of claim 3, wherein each instruction comprises (i) an operation from a predetermined set of operations and (ii) a set of arguments.

5. The method of claim 3, further comprising: initializing each of the first candidate setup function, the first candidate predict function, and the first candidate predict function of the first candidate machine learning algorithm in the sequence of candidate machine learning algorithms with one or more instructions.

6. The method of claim 3, wherein searching for one or more candidate machine learning algorithms through the machine learning algorithm search space comprises performing a random search process.

7. The method of claim 3, wherein searching for one or more candidate machine learning algorithms through the machine learning algorithm search space comprises searching using reinforcement learning or Bayesian optimization.

8. The method of claim 3, wherein searching for one or more candidate machine learning algorithms through the machine learning algorithm search space comprises performing a regularized evolution search process, comprising:
- selecting a parent candidate machine learning algorithm from the current sequence of candidate machine learning algorithms, the parent candidate machine learning algorithm comprising a parent setup function, a parent predict function, and a parent learn function, and
- modifying the parent candidate machine learning algorithm to generate one or more child candidate machine learning algorithms, each child candidate machine learning algorithm comprising a child setup function, a child predict function, and a child learn function.

9. The method of claim 8, wherein selecting the parent candidate machine learning algorithm from the current sequence of candidate machine learning algorithms comprises:
- randomly choosing a plurality of candidate machine learning algorithms from the current sequence of candidate machine learning algorithms, and
- selecting a chosen candidate machine learning algorithm with the highest performance metric among the plurality of candidate machine learning algorithms as the parent candidate machine learning algorithm.

10. The method of claim 8, wherein modifying the parent candidate machine learning algorithm to generate the one or more child candidate machine learning algorithms comprises:
- performing the following steps for one or more times:
  - for at least one of the parent setup function, the parent predict function, or the parent learn function of the parent algorithm, performing at least one of (i) inserting a random instruction into a random position in the current function, (ii) removing an instruction at a random location in the current function, (iii) randomizing all the instructions in the current function, or (iv) modifying a random argument of another random instruction in the current function, and creating a child candidate machine learning algorithm based on the at least one of the modified parent setup function, the modified parent predict function, or the modified parent learn function.

11. The method of claim 10, further comprising: adding the one or more child candidate machine learning algorithms to the current sequence of candidate machine learning algorithms.

12. The method of claim 11, further comprising: removing a removal candidate machine learning algorithm from the current sequence of candidate machine learning algorithms.

13. The method of claim 12, wherein the removal candidate machine learning algorithm is the oldest candidate machine learning algorithm in the current sequence of candidate machine learning algorithms.

14. The method of claim 8, wherein the regularized evolution search process is executed in parallel.

15. The method of claim 11, wherein adding a child candidate machine learning algorithm from the one or more child candidate machine learning algorithms into the current sequence of candidate machine learning algorithms further comprises:

performing a novelty check that confirms whether the child candidate machine learning algorithm has a different behavior compared to the current sequence of candidate machine learning algorithms, in response to a determination that the novelty check is yes, adding the child candidate machine learning algorithm into the current sequence of candidate machine learning algorithms, or in response to a determination that the novelty check is no, skipping evaluation of the child candidate machine learning algorithm.

16. The method of claim 15, wherein the novelty check is performed by using a functional equivalence checking technique.

17. The method of claim 1, wherein the output machine learning algorithm defines (i) a model architecture for a machine learning model for performing the particular machine learning task, (ii) hyperparameters for training of the machine learning model to perform the particular machine learning task, and (ii) preprocessing techniques applied to inputs during, after, or both the training.

18. A system comprising one or more computers and one or more storage devices storing instructions that when executed by the one or more computers cause the one or more computers to perform operations for performing a particular machine learning task, the operations comprising:

receiving a set of training examples, each training example in the set of training examples comprising an example input and an example output;

receiving a set of validation examples, each validation example in the set of validation examples comprising a validation input and a validation output;

generating a sequence of candidate machine learning algorithms to perform the particular machine learning task, comprising searching for one or more candidate machine learning algorithms through a machine learning algorithm search space, wherein each candidate machine learning algorithm in the sequence is represented as a computer program comprising (i) a respective candidate setup function that initializes one or more training parameters of the candidate machine learning algorithm, (ii) a respective candidate learn function that adjusts training parameters of the candidate machine learning algorithm, and (iii) a respective candidate predict function that predicts an output for a given input using the adjusted training parameters, and wherein the machine learning algorithm search space is defined by instructions that act on addresses in a virtual memory to specify mathematical operations that define respective logic for the setup function, the learn function, and the predict function;

for each candidate machine learning algorithm in the sequence:

setting up one or more training parameters for the candidate machine learning algorithm by executing the candidate setup function, training the candidate machine learning algorithm to adjust the one or more training parameters by processing the set of training examples using the candidate predict function and the candidate learn function, and evaluating a performance of the trained candidate machine learning algorithm by executing the candidate predict function on the set of validation examples to determine a performance metric for the trained candidate machine learning algorithm; and selecting a trained candidate machine learning algorithm with the best performance metric among the trained candidate machine learning algorithms as an output machine learning algorithm for the particular machine learning task.

19. One or more non-transitory computer storage media storing instructions that when executed by one or more computers cause the one or more computers to perform operations for performing a particular machine learning task, the operations comprising:

receiving a set of training examples, each training example in the set of training examples comprising an example input and an example output;

receiving a set of validation examples, each validation example in the set of validation examples comprising a validation input and a validation output;

generating a sequence of candidate machine learning algorithms to perform the particular machine learning task, comprising searching for one or more candidate machine learning algorithms through a machine learning algorithm search space, wherein each candidate machine learning algorithm in the sequence is represented as a computer program comprising (i) a respective candidate setup function that initializes one or more training parameters of the candidate machine learning algorithm, (ii) a respective candidate learn function that adjusts training parameters of the candidate machine learning algorithm, and (iii) a respective candidate predict function that predicts an output for a given input using the adjusted training parameters, and wherein the machine learning algorithm search space is defined by instructions that act on addresses in a virtual memory to specify mathematical operations that define respective logic for the setup function, the learn function, and the predict function;

for each candidate machine learning algorithm in the sequence:

setting up one or more training parameters for the candidate machine learning algorithm by executing the candidate setup function, training the candidate machine learning algorithm to adjust the one or more training parameters by processing the set of training examples using the candidate predict function and the candidate learn function, and evaluating a performance of the trained candidate machine learning algorithm by executing the candidate predict function on the set of validation examples to determine a performance metric for the trained candidate machine learning algorithm; and selecting a trained candidate machine learning algorithm with the best performance metric among the trained candidate machine learning algorithms as an output machine learning algorithm for the particular machine learning task.

20. The system of claim 18, wherein the machine learning algorithm search space is defined by a sequence of instructions, wherein the sequence of instructions includes (i) instructions that specify the operations performed by a setup function of a given candidate machine learning algorithm, (ii) instructions that specify the operations performed by a learn function of the given candidate machine learning algorithm, and (iii) instructions that specify the operations performed by a predict function of the given candidate machine learning algorithm.

* * * * *